April 5, 1960      J. P. VINDING      2,931,952
DRIVER FOR PULSING INDUCTIVE CIRCUITS
Filed Feb. 1, 1957      2 Sheets-Sheet 2
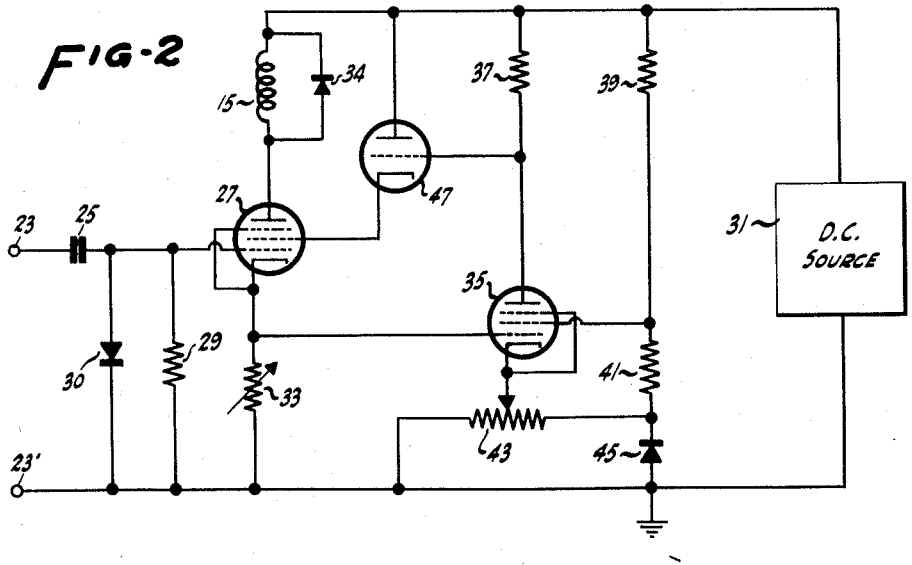
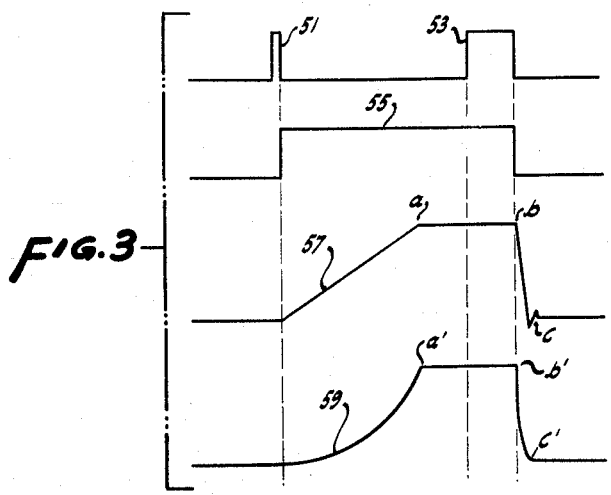
INVENTOR.
JORGEN P. VINDING
BY
ATTORNEYS

United States Patent Office 2,931,952
Patented Apr. 5, 1960

2,931,952

DRIVER FOR PULSING INDUCTIVE CIRCUITS

Jorgen P. Vinding, Los Gatos, Calif., assignor, by mesne assignments, to Monogram Precision Industries, Inc., Culver City, Calif., a corporation of California Application February 1, 1957, Serial No. 637,766

5 Claims. (Cl. 317—123)

This invention relates to apparatus for producing current pulses of definite maximum value and of very short cutoff time in inductive circuits.

There are various situations wherein the ability to produce pulses of this character is of value. One such situation arises in connection with pulsed radar equipment, wherein it is desired to switch an antenna between a transmitter and a receiver. The pulses from the transmitter are extremely powerful; they recur cyclically at a fixed repetition frequency and the length of the pulses is very short in comparison with the period of repetition. Thus, for example, the duration of the transmitter pulses is normally a few microseconds at most and may be a fraction of a microsecond, while the period of repetition may be several milliseconds. The transmitted pulse must be rigorously excluded from the receiver in order to prevent paralysing or even destroying it, but at the end of the pulse the more quickly the receiver can be connected to the antenna the better, for there is always the "blind spot" or area surrounding the radar equipment, whose radius is determined by the interval between the initiation of the transmitter pulse and the instant when the receiver is connected to the antenna and able to receive the radar echoes.

In the past the switching operation has usually been accomplished by means of a "T-R box;" in essence, a variable impedance effectively inserted in a waveguide or transmission line, this impedance usually being in the nature of a spark gap offering an infinite impedance until broken down by the voltage from the transmitter, and, after breakdown, constituting substantially a short circuit. These devices have been connected in various ways and have been of greater or less complexity. All of them have their disadvantages.

More recently the use of circulators has been suggested for isolating transmitters and receivers connected to a common antenna. Such circulators are devices employing the nonreciprocal properties of magnetized ferrites. In general they comprise waveguides connected in a loop that interconnects three or more radiating arms, each arm a transmission line. They have the property of directing substantially all of the power supplied to the circulator through one arm to a single one of the other connected arms; thus if the lines connected to the circulator are designated as A, B, C, etc. power supplied through arm A will appear in arm B, that supplied to arm B will appear in arm C, and, in a three-line circulator, power supplied at arm C will appear in arm A.

While such circulators are quite effective in attenuating the power reaching, say, arm C from arm A, so that the proportion of the total reaching arm C is small, in terms of percentage they are not completely effective. With high power transmitters and sensitive receivers the circulator alone is not adequate to give the desired degree of isolation of the receiver during the transmitting period. For this reason there has been added to the circulator an electrically-variable attenuator, interposed in the receiver arm of the circulator and actuated concurrently with the transmitter pulse. The attenuator also uses the gyromagnetic properties of ferrite to accomplish its attenuation, but whereas the circulator is a passive network, the polarization of the ferrites being constant and usually accomplished by means of permanent magnets, a preferred form of the attenuator is, in a sense, an active network. The ferrite is polarized electromagnetically by a coil surrounding the ferrite. With one degree of magnetization, waves transmitted through the wave guide are polarized in a plane that will be transmitted substantially without attenuation, while with another degree of magnitude of magnetization the plane of polarization is rotated 90 degrees and the waves are absorbed, reflected, or both. Since the angle of rotation of the plane of polarization is a function of the intensity of magnetization of the ferrite, it is highly important that the current through the coil be accurately controlled in both the transmitting condition, in order to achieve maximum isolation of the receiver to prevent its overloading, and in the receiving condition in order to give the receiver its maximum possible sensitivity. By proper design of the attenuator the coil current may be made either zero or finite for either degree of attenuation.

Other forms of attenuator than those using rotation of the plane of polarization may be employed, using other aspects of gyromagnetism, but whatever form is employed the degree of magnetization in the transmitting and attenuating states is critical.

Whatever form of gyromagnetic attenuator is used the polarizing coils are necessarily inductive. The exciting currents in these coils therefore tend to build up slowly and to die out slowly, thus limiting the speed with which the switching operation between the pass and attenuating conditions can be accomplished. Both the build-up and the die-out times are functions of the ratio of the inductance of the circuit to its resistance, i.e., to the time constant of the entire exciting circuit. In switching operations such as those here considered, where the device must be in the attenuating condition for a few microseconds at most, the ratio of inductance to resistance is so large that the time constant may be considered as infinite, the resistance neglected, and the build-up of the current in the coil may be considered a linear function of time. When the exciting circuit is opened the resistance becomes infinity and the time constant drops to zero, if it be assumed that the transition between finite and infinite resistance can be made so sudden as to occupy zero time. Even in a circuit with a fixed ratio of inductance to resistance, to which the exciting voltage is suddenly applied, the time required for the current to build up to the definite value that will cause maximum attenuation is in inverse proportion to the applied voltage.

In order to accomplish this type of switching with maximum speed, the positive voltage applied to the polarizing coil should be high until the current reaches the exact value required. It should then suddenly drop to the value necessary to maintain the current through the relatively small resistance of the circuit, and finally the circuit should open as rapidly as possible.

This, in effect, is what is accomplished by the apparatus of the present invention and one object of the invention is to provide a driving circuit for switching an attenuator of the character described that will meet the requirement of a "T-R box," not only as well as but better than the ordinary discharge type. More broadly, however, the object of the invention is to provide a driver or exciter for any inductive circuit that will raise the current flowing therein to a desired maximum value in as short a time as may be required, maintain it at that value, and then cut it off, again in minimum time. State even more broadly, an object of the invention is to provide a circuit that will pulse a magnetic field at maximum speed, whether that field is to be increased from zero to a finite value, decreased from a finite value to zero, or reversed. Other objects of the invention are to provide a driver of the character described wherein the values of the current in the two conditions of pulsed operation can be set with a high degree of accuracy, to provide a circuit wherein the switching speed is limited by the natural period of oscillation of the device, rather than by the inductance of the driven circuit, and to provide a driver for pulsed inductive circuits that is relatively unaffected by such changes in primary supply voltages as may be normally expected. Other objects and advantages will appear in the course of the present specification.

The driver of this application is adapted for triggering or actuation by a rectangular voltage pulse, and the rise time (or fall time) may easily be made very steep. The excitation of the inductive load circuit is derived from a current source supplying a voltage that is many times that required to maintain the desired critical current value in the load after steady-state conditions have been attained; the higher this driving voltage the shorter will be the rise-time of the current in the load to its ultimate, critical value. The source and load are connected in series as the output circuit of an amplifier having a plurality of control electrodes, e.g., a pentode. One of the control electrodes connects to the input circuit supplied by the actuating pulse. Also included in the output circuit of the amplifier is a series resistor.

A second amplifier, having at least one control electrode, is also connected across the supply source in series with a load resistor, the amplifier and its resistor forming the two arms of the voltage divider. The voltage applied to the control electrode of the second amplifier is derived from the drop across the series resistor in the load circuit of the first amplifier, superposed on a bias voltage. The drop across one arm of the voltage divider is applied to a second control electrode of the first amplifier. This may be done either directly or through a third amplifier, which may be a vacuum tube connected as a cathode follower or a transistor operated in a similar manner. The actuating or triggering pulse is applied to the control electrode of the first amplifier in such sense as to make it conductive; the effective voltage across the load is that of the triggering pulse times the amplification constant of the amplifier and approaches the supply voltage in value. As the current builds up in the inductive load the voltage drop across the series resistor increases and is applied to the control electrode of the second amplifier. The latter is preferably biased below cutoff and in the cutoff condition offers a substantially infinite impedance in one arm of the voltage divider. As soon as the increasing voltage drop overcomes the biasing voltage, the tube starts to conduct and its effective D.C. resistance drops to a relatively low value. This suddenly changes the division of voltage across the divider and the circuit is so arranged that the change in voltage, applied to the second control electrode of the first amplifier, opposes further increases in load current. The cutoff is extremely sharp and accurate, limiting the current in the inductive load to the precise value set by the bias on the second amplifier tube. The first amplifier is so biased that at the cessation of the actuating pulse the amplifier goes below cutoff, causing immediate interruption of the circuit. There may be some slight oscillation resulting from the shock of the cutoff, at a frequency determined by the inductance of the circuit and the inevitable capacities therein. Practically, such oscillations may be of advantage in causing rapid demagnetization of the ferrite. The oscillations thus induced die out very rapidly, and the switching operation from maximum to minimum attenuation can be accomplished in about one-half microsecond, making it much more rapid than has previously been possible with apparatus of this type.

With voltage sources of moderate value the build-up of the coil current is inherently slower than the cutoff operation. In the particular application of the apparatus that has been described in detail a relatively slow operation in switching from the receiving to transmitting condition is no disadvantage. The pulse repetition period is made long enough so that echoes from the most distant objects that can be detected will have died out before a succeeding pulse is transmitted, with some additional latitude to permit the apparatus to "settle down." A rise-time for the switching pulse of several microseconds is therefore quite permissible. There are certain advantages, however, in having maximum attenuation with zero polarization of the ferrite. This can be accomplished by providing a continuous polarization in the opposite direction from that provided by the load coil driven by the present apparatus, so that the build-up of current in the coil neutralizes the polarization which is re-established when the driver breaks the circuit.

The accompanying drawings illustrate the detailed description of a preferred form of the invention which follows. In the drawings:

Fig. 2 is a schematic drawing of the driver of Fig. 1; and

Fig. 3 is a series of curves illustrative of the waveforms developed in various portions of the circuit of Figs. 1 and 2.

Figure 1:
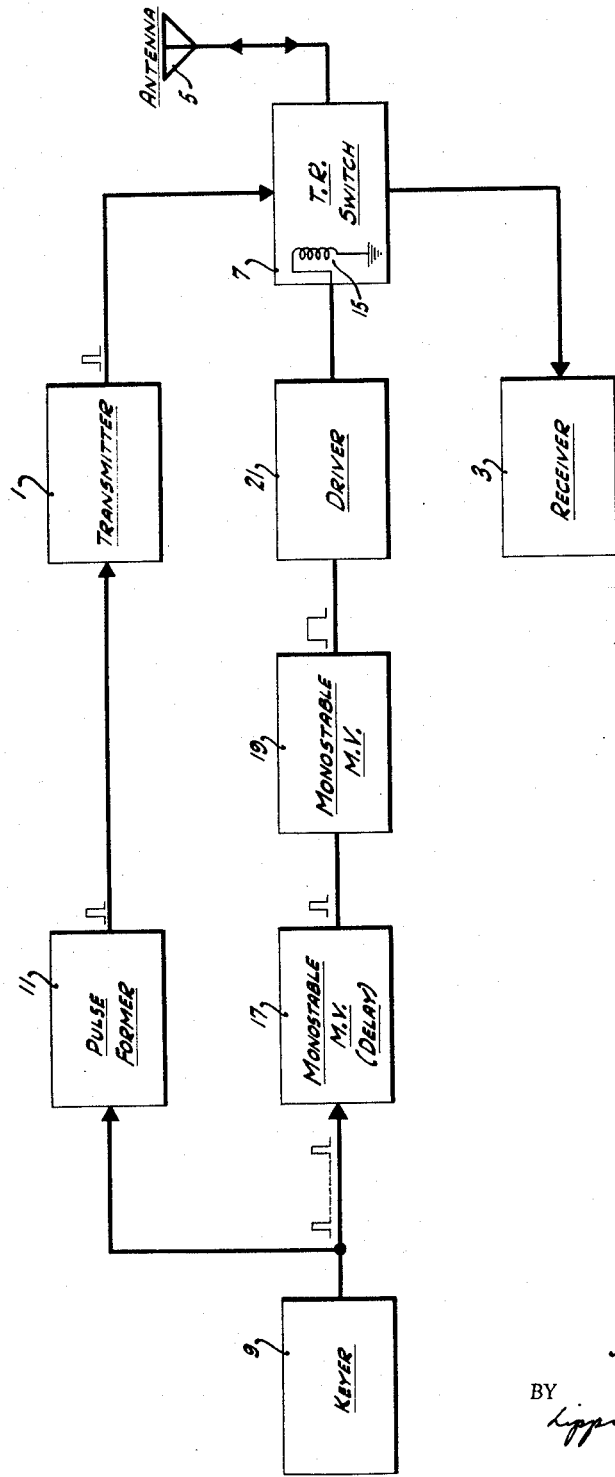
Fig. 1 is a block diagram of a radar system including a driver in accordance with the present invention and apparatus suitable for developing the actuating pulses.

In Fig. 1 there is shown, in highly simplified block form, a radar system adapted to connect a transmitter 1 and a receiver 3, alternatively, to a common antenna 5 by means of a T-R switch 7 of the type described in general above. In the equipment shown, a keyer, 9, develops short, rectangular pulses, having a duration of a few microseconds at the very most, at a pulse repetition rate that is determined by the range of the particular equipment involved. The impulses from the keyer trigger a pulse-forming network 11 that actuates transmitter 1, whose active element is usually either a magnetron or a klystron developing waves in the microwave portion of the spectrum. These waves are supplied to the switch 7 and thence to the antenna 5 through suitable waveguides or equivalent transmission lines. Received waves are directed by the switch, including the circulator, to the receiver 3. Spill-over from the transmitter into the receiver is prevented when current flows in the inductive coil 15 within the T-R switch.

The same pulses that trip the pulse-former 11 are also transmitted to a monostable multivibrator 17. At the moment of receiving the triggering pulse this multivibrator is in its stable state; the pulse trips it, causing it to assume its quasi-stable state for an interval slightly less than the pulse-repetition period, at which time it returns to its stable state and passes on a pulse to a second monostable multivibrator 19, tripping it so that it develops a rectangular pulse of a few microseconds duration before returning to its stable state. It is this pulse that actuates the driver 21, causing it to energize coil 15 and switch receiver 3 completely out of the circuit. Multivibrators 17 and 19 are so timed that the trailing edge of the pulse from multivibrator 19 coincides with the trailing edge of the pulse of transmitter 1. In the apparatus described the final pulse supplied to the driver swings positive; the polarity of the other pulses is more or less immaterial, since the multivibrators can be made to trip on pulses of either sign.

Fig. 2 shows a preferred embodiment of the driver represented by the block 21, plus the coil 15, which is designated by the same reference character in Fig. 2.

The positive pulse from multivibrator 19 is applied across terminals 23, 23', the latter being at base or ground potential. Terminal 23 connects through a blocking condenser 25 to the control grid of a pentode 27. A grid resistor 29 in parallel with a clamp diode 30 connects from grid to ground and the time-constant of the blocking condenser and the grid resistor is chosen large enough in comparison to the pulse repetition rate so that the clamp holds tube 27 below cut-off except during the pulse, when the grid is raised to ground potential level. The output or load circuit of tube 27 can be traced from a suitable source 31, the negative end of which is grounded, through coil 15 to the anode of tube 27, thence through the space path within the tube to the cathode and through a variable series resistor 33 back to ground. Optionally a diode 34 may be connected across all or part of coil 15 to snub or damp shock-excited oscillations therein after the first one-quarter cycle but as will be shown hereinafter such oscillations may be desirable and usually this diode will be omitted in the particular type of equipment shown. In other types of inductive circuits where it would be more desirable the diode could be connected as shown or included in a separate closely coupled circuit.

A second amplifier, preferably a sharp cut-off pentode, is connected in series with an anode resistor 37 across the source 31. The biases supplied to tube 35 are adjustable, but once adjusted, are substantially fixed. They are derived from a voltage divider comprising a pair of fixed resistors 39 and 41, connected across the supply 31 in series with a potentiometer 43. Bias to the screen grid of tube 35 is taken off from the junction between resistors 39 and 41. The cathode is biased, from a connection taken off from the potentiometer 43, to a selected value below cutoff. The cathode bias is maintained at substantially constant value by means of a Zener diode 45, connected from the junction between resistor 41 and potentiometer 43 to ground. The diode is connected to be normally non-conducting, but when the voltage applied to its terminals exceeds a fixed value it breaks down and conducts. It thus acts as a voltage regulator, so that if the current through the tube 35 rises, tending to increase the positive bias on the cathode and cut off the tube, this rise is limited to a definite equilibrium value and there maintained.

The control voltage of tube 35 is taken off from the cathode of tube 27, and is therefore equal to the drop through resistor 33, minus the cathode bias on tube 35.

It will be seen that tube 35 and resistor 37 constitute a second voltage divider. As long as tube 35 is cut off it offers infinite impedance and its anode is at the potential of the source 31. Even a very small value of current through tube 35, however, will change this situation completely; with an assumed value of one megohm for resistor 37, a current of 0.1 milliampere through the tube 35 will drop its anode potential 100 volts. It is this anode potential that is applied to the screen grid of tube 27 to limit the current through the latter when it reaches the desired value. It will be seen that when the actuating pulse is applied to the grid of tube 27 it will immediately start to conduct, but because of the inductive impedance of coil 15 the current cannot rise instantly. As it increases however, the drop through resistor 33 also increases and when the voltage across it exceeds the cutoff value of tube 35 the latter immediately starts to conduct, dropping the voltage of screen grid of tube 27 very rapidly and thereby limiting the output current of tube 27.

It is possible, by proper choice of values for tube 35 and resistor 37 to apply the screen grid voltage to tube 27 directly from the anode of tube 35. It is better, however, to use an additional tube 47 to transfer the current-limiting voltage to the screen. The cathode of tube 47 connects directly to the screen grid of tube 27, its anode connects to the positive terminal of the D.C. source and its grid connects to the anode of tube 35. The advantage of using the additional tube lies in the fact that the screen grid of tube 27 does draw current and as it is connected directly to the anode of tube 35 this current would flow through resistor 37, the screen grid cathode circuit of tube 27 would be effectively in parallel with tube 35, and the device would become very insensitive if a direct connection were used. Since the apparatus is pulse operated it would be possible to supply the screen-grid bias through a suitable resistance-capacitance network that would isolate the two circuits as far as direct current is concerned. The use of the additional tube is actually simpler and more elegant. With the connection shown the tube 47 acts as a cathode follower and the load circuit is that from its cathode, through the space-path between screen grid and cathode of tube 27, and the resistor 33. This path will normally have a very high impedance as compared with the tube 47 and such being the case the amplification factor of tube 47 is substantially unity. As a result the screen grid of tube 27 operates at substantially source potential until tube 35 starts to conduct and then drops rapidly to a value that will maintain the current through resistor 33 constant.

It will be seen that there are two ways in which the value of the output current through coil 15 can be adjusted. The first of these is by varying the value of resistor 33; the higher this resistance the greater the drop across it produced by a given current. The second is by varying the point of contact on the potentiometer 43 which connects to the cathode of tube 35, thereby setting the value to which the voltage across resistor 33 must rise before it reaches the cutoff of tube 35. The provision of both of these methods of adjustment permits a wider selection of tubes and of Zener diodes. It also permits the use of the same type of driver for inductive loads having widely different characteristics.

The waveforms illustrated in Fig. 3 are substantially those developed in a test of the apparatus shown, idealized as little as possible in drafting them mechanically. The time base shown is the same for all the curves. Starting with the upper curve, pulse 51 is that developed by multivibrator 17, while pulse 53 (shown to a quite different scale) is the pulse exciting the transmitter. In the next curve below, pulse 55 is that developed by multivibrator 19, and triggered by pulse 51 it starts substantially coincidentally therewith and is timed so that it ends at the same instant as pulse 53.

Curve 57 is the current wave through the coil 15. It will be seen that it rises substantially linearly to a definite value at point $a$, from which point it remains constant until the termination of pulse 55, the change in slope at point $a$ being extremely sharp. At point $b$, coinciding with the termination of pulse 55, the current drops at a rate determined by the natural frequency of oscillation of coil 15 itself to point $c$ where a small and quickly damped oscillation occurs. As has already been mentioned this oscillation is of value in promoting demagnetization of the ferrite.

Curve 59 illustrates the attenuation of a wave of constant amplitude beginning prior to the rise of pulse 55 and continuing after the end of that pulse. The attenuation starts to rise very gradually as soon as the pulse is applied, rising with constantly increasing slope up to point $a'$, coinciding in time with the instant that the coil current reaches maximum value. The total attenuation can be of the order of 50 db, or even more if a two-stage attenuator is used. It remains constant up to the point $b'$ and then falls rapidly to a minimum at point $c'$, corresponding to the end of the oscillation shown at $c$ in the preceding curve. No oscillation is detectable in the attenuation, and the circuit to the receiver is effectively completely closed within one-half microsecond following the termination of the pulse 55.

In making the tests thus illustrated it will be seen that the receiver is fully isolated for a period before the start of the transmitter almost equal to the length of that pulse. The transmitter pulse is approximately one microsecond long, the receiver is completely out of the circuit for about two microseconds and sensitivity to incoming signals starts to decrease about 5 microseconds prior to the start of the transmitter pulse. With a period of milliseconds between pulses this lapse of time is of no real importance, since the pulse repetition period is always made long enough for the received echoes to drop well below the noise level, up to which they can be recognized, before the next pulse occurs. Allowing somewhere in the neighborhood of 6 microseconds for the entire operation provides a valuable safety factor. If necessary, however, the operation can be speeded up a very considerable degree on the build-up side. In making the test illustrated the supply voltage from the source 31 was approximately 100 volts. Ordinary receiving tubes, of the character used for tube 37, will operate satisfactorily at voltages from three to five times this value, and if higher voltages are desired tubes are available that will accommodate them. With a 500-volt source the rise-time between the initiation of the pulse 55 and point $a$ of curve 57 would be decreased to approximately one-fifth of that shown, and the tolerances bewteen point $a$ and the start of the transmitter pulse 53 could be reduced materially without danger. If it were at all necessary the entire operation could therefore be greatly speeded up.

It is frequently desirable that an attenuator of the type described be arranged so that it gives maximum attenuation with zero current and requires that current flow in the coil in order to give minimum attenuation. If so arranged the attenuator acts as a "shutter" that isolates the receiver when the apparatus as a whole is not in operation and prevents overloading by pulses from other equipment in close proximity. One way of accomplishing this would, of course, be to reverse the two epochs of operation of the switch, but this may not be the most advantageous method, since the current breaking operation is usually more rapid than the "make," if the more usual types of tube are used at their rated voltages.

The curves show a rise time of about 4 microseconds for the current in the coil and a "break" or fall time of about 0.5 microsecond. Roughly 8 times the supply voltage would reduce the rise time to a value equal to the fall. The inductive kick developed at the break would be no greater than in the arrangement shown, but added to the supply voltage could give a total that could readily cause flash-over unless due precautions were taken. Additional driving-pulse power, amplification in tube 27, or both would also have to be provided.

It is therefore usually more economical either to provide a separate shutter or to balance out a constant polarizing current with the pulse to reverse the operation of the switch. This latter procedure involves additional apparatus more properly included in another patent application. There are, however, other variations of the circuit here disclosed that should be obvious to those skilled in the art. Transistors are now available that can be substituted for tubes 35 and 47 and it is to be expected that some will be developed having the general characteristics of tube 27. Such substitutions are contemplated by the present inventor.

Without departing from vacuum tubes there are several variants that suggest themselves. The relative positions of tube 35 and resistor 37 can be reversed and by using a plate-loaded amplifier instead of a cathode follower for tube 47 substantially similar results can be achieved. The illustration here given is believed to represent the most convenient form of the invention, the scope of which is defined by the following claims.

I claim:

1. A driver for effecting rapid switching of current of controlled maximum value in an inductive load comprising a vacuum tube having a cathode, an anode, and a plurality of grids, an input circuit for applying switching pulses to one of said grids, a resistor connected to said cathode, terminals for connecting said load and for connecting a source of exciting current for said load in series with said resistor, cathode, anode and load, an amplifier having a cathode, an anode and a control electrode, a resistive element connected in series with the cathode and anode of said amplifier, said resistive element and said amplifier being connected across the terminals for connecting said source to form a voltage-divider, connections for applying the voltage drop across said resistor to vary the effective impedance of said amplifier, and connections for applying a portion of the voltage across said voltage-divider to a second grid of said vacuum tube to limit the current flowing in the cathode-anode circuit thereof.

2. A driver as defined in claim 1 wherein said last-mentioned connections comprise a vacuum tube having a cathode connected to said second grid, an anode connected to said source, and a control-grid connected to an intermediate point on said voltage-divider.

3. A driver as defined in claim 1 including, in addition, means for biasing said amplifier to cut-off in the absence of current through said resistor.

4. Apparatus for rapidly switching on-and-off and regulating the amplitude of electric current from a supply through an inductive load, comprising a resistor, a variable-conductance device connected in closed series circuit relation with said resistor and supply and load, whereby said device controls the flow of current through the load and a voltage drop proportional to said current appears across said resistor, said device having control means for varying the flow of current therethrough, means for supplying input pulses to said control means for periodically starting and stopping the flow of current through said device whereby the current through the load is switched on and off periodically, an amplifier, a bias-voltage source connected to bias said amplifier beyond cutoff, connections for applying the voltage drop across said resistor to said amplifier in opposition to the bias voltage, whereby said amplifier provides an amplified signal proportional to the amount by which said voltage drop exceeds a value determined by said bias voltage, and connections applying said amplified signal to said control means in a sense to reduce the flow of current through said device, whereby the amplitude of the current through the load is regulated.

5. Apparatus for rapidly switching on-and-off and regulating the amplitude of electric current from a supply through an inductive load, comprising a resistor, a vacuum tube having an anode and a cathode connected in closed series circuit relation with said resistor and supply and load, whereby said vacuum tube controls the flow of current through the load and a voltage drop proportional to said current appears across said resistor, said tube also having at least two grids for controlling the flow of current between said anode and cathode, means for supplying input voltage pulses to one of said grids for periodically starting and stopping the flow of current through said tube, whereby the current through the load is switched on and off periodically, an amplifier, an adjustable bias-voltage source connected to bias said amplifier beyond cutoff, connections for applying the voltage drop across said resistor to said amplifier in opposition to the bias voltage, whereby said amplifier provides an amplified signal proportional to the amount by which said voltage drop exceeds a value determined by the adjustment of said bias voltage source, and connections applying said amplified signal to the other of said grids in a sense to reduce the flow of current through said tube, whereby the amplitude of the current through the load is regulated.

References Cited in the file of this patent
UNITED STATES PATENTS

| 2,521,824 | Brown | Sept. 12, 1950 |
| 2,531,446 | Levy | Nov. 28, 1950 |
| 2,666,815 | Chapin | Jan. 19, 1954 |
| 2,691,101 | Casey | Oct. 5, 1954 |